United States Patent [19]

Würl et al.

[11] Patent Number: 5,020,914
[45] Date of Patent: Jun. 4, 1991

[54] PROCESS FOR REMOVING THE SCREW FROM THE SCREW CYLINDER OF A SCREW-TYPE INJECTION MOLDING MACHINE AND A SCREW-TYPE MOLDING MACHINE OF CORRESPONDENCE CONFIGURATION

[75] Inventors: Ernst Würl, Höttingen; Alfred Hafner, Fürth; Jürgen Paulsen, Nuremberg; Peter Marienfeld, Hersbruck; Bruno Grögor, Leinburg, all of Fed. Rep. of Germany

[73] Assignee: Mannesmann AG, Dusseldorf, Fed. Rep. of Germany

[21] Appl. No.: 382,786
[22] PCT Filed: Oct. 10, 1987
[86] PCT No.: PCT/DE87/00463
§ 371 Date: Jun. 19, 1989
§ 102(e) Date: Jun. 19, 1989
[87] PCT Pub. No.: WO88/04605
PCT Pub. Date: Jun. 30, 1988

[30] Foreign Application Priority Data

Dec. 22, 1986 [DE] Fed. Rep. of Germany ....... 3643884

[51] Int. Cl.⁵ .............................................. B29B 1/04
[52] U.S. Cl. ..................................... 366/79; 425/190
[58] Field of Search ................. 366/78, 79, 80, 81, 366/88, 89, 90, 318, 319, 320, 321, 322, 323, 324; 425/182, 190

[56] References Cited

U.S. PATENT DOCUMENTS 3,101,512  8/1963  Goller .
3,921,963 11/1975  Neff ........................................ 366/79
4,070,139  1/1978  Linde ...................................... 366/79
4,384,395  5/1983  Gietman et al. .
4,680,002  7/1987  Hehl ..................................... 425/190

FOREIGN PATENT DOCUMENTS 2291848 10/1975 France .
60-154026 12/1985 Japan .

OTHER PUBLICATIONS

Article (German) from Kunststoffe, BD. 61, No. 6 (Jun. 1971).

*Primary Examiner*—Robert W. Jenkins
*Attorney, Agent, or Firm*—Hoffmann & Baron

[57] ABSTRACT

A process for removing the screw from the screw cylinder of a screw-type injection molding machine and a screw-type injection molding machine of a corresponding configuration, having a base frame for receiving an injection unit which comprises a screw cylinder (1), a screw which is rotatable and axially displaceable in the screw cylinder and a drive device (2) for the screw, which is arranged axially behind the screw cylinder. The screw cylinder (1) is releasably connected to the drive device (2) and is pivotable, independently of the drive device (2), about a pivot axis (6) which extends vertically at a spacing in front of its rear end. The screw cylinder (1) and/or the drive device (2) are arranged to be movable separately from each other on the injection molding machine in the axial direction of the injection unit in order for the rear end of the screw to be pulled out of the drive device (2) after the connection has been released.

12 Claims, 6 Drawing Sheets

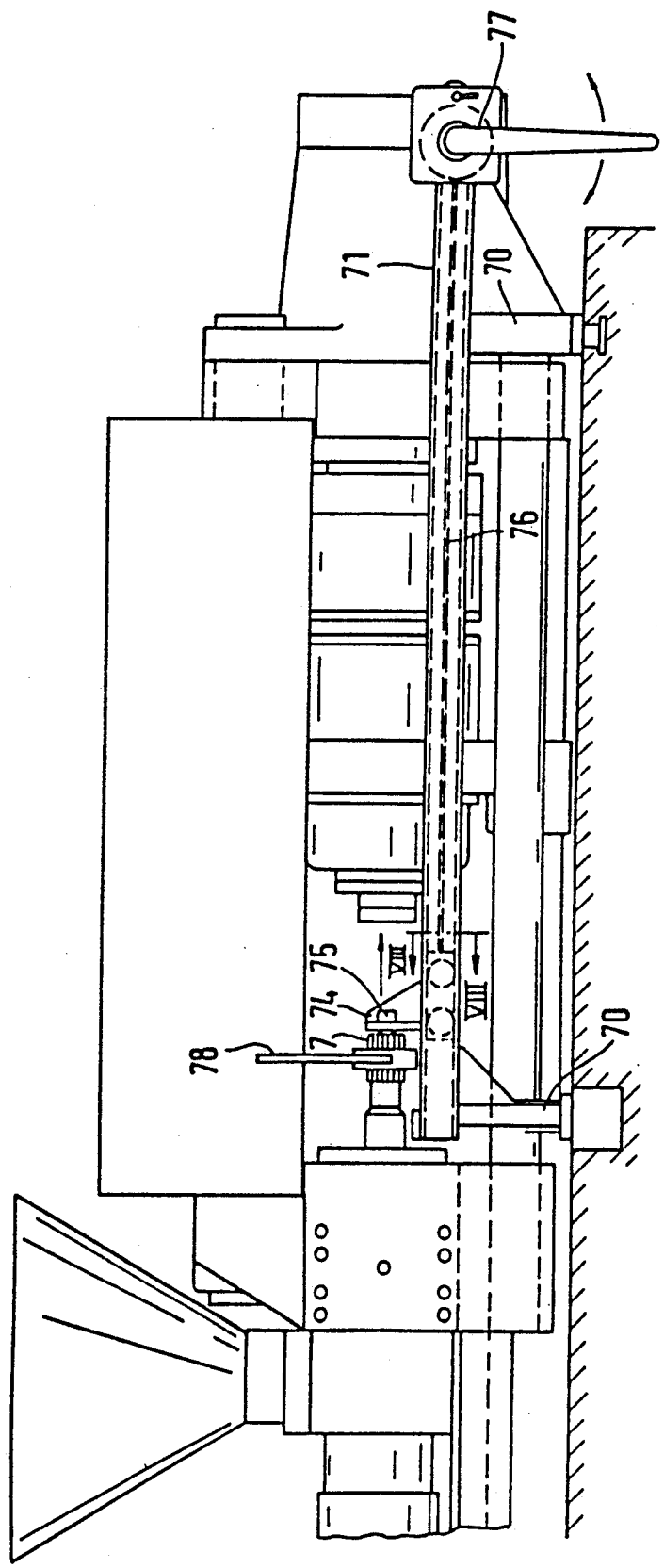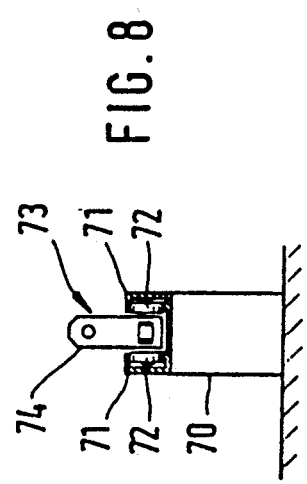
FIG. 7
FIG. 8

PROCESS FOR REMOVING THE SCREW FROM THE SCREW CYLINDER OF A SCREW-TYPE INJECTION MOLDING MACHINE AND A SCREW-TYPE MOLDING MACHINE OF CORRESPONDENCE CONFIGURATION

BACKGROUND OF THE INVENTION

The invention relates to a process for removing the screw from the screw cylinder of a screw-type injection molding machine wherein the drive device for the screw is released from the rear end of the screw cylinder and the screw is withdrawn rearwardly from the opened screw cylinder. The invention also concerns a screw-type injection molding machine which is of a suitable configuration for carrying out the screw removal process. Finally the invention is concerned with an auxiliary apparatus for carrying out the process.

Removal of the screw of a screw-type injection molding machine is an operation which has to be repeatedly carried out in operation for the purposes of servicing, for the purposes of replacing the screw by a screw of a different geometry or size and also for the purposes of dealing with damage. In order to make the removal operation as easy as possible for the user, the screw-type injection molding machine must already be structurally designed for that purpose. The most usual procedure involved in removing the screw provides for a pivotal movement of the complete injection unit comprising a screw cylinder with the screw therein and the drive device for the screw, which is arranged behind the screw cylinder, about a vertical pivot axis which is disposed approximately at the longitudinal center of the injection unit. The pivotal movement is produced in such a way that the front end of the screw cylinder (injection end) faces towards the operating side of the injection molding machine and is accessible for the purposes of removing the cylinder head. By actuating the drive device for the axial stroke movement of the screw, that is to say the hydraulic injection cylinder, the screw can be pressed out forward through the open end of the cylinder and then withdrawn. However, in injection molding machines of medium size, as a result of the pivotal movement of the entire injection unit towards the side, the above-indicated procedure requires a comparatively large amount of space and, in relation to larger injection molding machines in which the injection unit already only be applied by a drive means which is specifically provided for that purpose. That drive means involves an additional amount of apparatus expenditure and in addition - if for reasons of saving space it must first be mounted in position prior to the operation of removing the screw - it takes up an additional amount of time. Added to that is the fact that removal of the screw forwardly through the screw cylinder is possible only when the diameter of the drive end of the screw which is generally provided with a tapered spline arrangement permits it. Having regard to the torques to be transmitted however the spline arrangement would frequently have to be larger in diameter than the inside diameter of the screw cylinder so that a compromise which in itself is undesirable must be made in regard to the load-carrying capacity of the spline arrangement if it is to be possible to carry out the operation of removing the screw in the above-described manner.

A screw removal process is also known in which the screw is withdrawn rearwardly from the screw cylinder so that there is no need to dismantle the cylinder head and also pivot the injection unit. With that process however the complete screw cylinder must be separated from the drive device so that the rear end of the cylinder and the screw are made accessible. That is very expensive and particularly when dealing with large injection molding machines, cannot be carried out without mechanical aids, because of the high weight of the screw cylinder.

SUMMARY OF THE INVENTION

The invention is therefore based on the object of providing a process for removing the screw and proposing a corresponding configuration of a screw-type injection molding machine, which require a smaller amount of space and which permit considerably easier handling with a reduced level of structural expenditure.

In accordance with the method and apparatus provided by the invention, the pivot axis of the screw cylinder is arranged at the longitudinal center thereof. The screw cylinder, even after the pivotal movement thereof, is supported substantially at its center of gravity on the base frame of the screw-type injection molding machine so that there is no need for an additional support arrangement and precise alignment thereof. Although in that respect fixing means are additionally required at the longitudinal center of the screw cylinder at the pivot mounting, the savings in costs considerably outweigh the additional expenditure, by virtue of the elimination of the support arrangement. Added to that is the fact that the screw cylinder can be more easily handled in the pivot movement involved. Finally the length of the pivotal movement and thus the amount of space required in respect of the screw cylinder in the pivotal position is relatively small.

The carriage for mounting the screw cylinder or the drive device can in principle be movable on the same frame members on which in ordinary operation of the injection molding machine the entire injection unit is longitudinally movable in order to move the injection end of the screw cylinder to the molding tool. Preferred however is a construction in which the carriage is movable on its own longitudinal rails as that provides for a greater degree of freedom in regard to the length of the distance of movement as between the drive device and the screw cylinder. In the case preferred herein, where the screw cylinder is mounted on the carriage and is axially displaceable therewith, it is also desirable for the pivot mounting for the screw cylinder to be provided on the carriage. In principle it would certainly also be possible for the carriage itself to be designed to be pivotable horizontally in the manner of a turntable.

Further advantageous embodiments of the injection molding machine are set forth in the subsidiary claims and the following description of a specific embodiment. In the drawings:

BRIEF DESCRIPTION OF THE DRAWINGS

FIG. 7 is a diagrammatic side view of the injection unit and an auxiliary apparatus which is attached to the injection molding machine, for withdrawing the screw, and FIG. 8 is a view in cross-section through the auxiliary apparatus taken along line VIII—VIII in FIG. 7.

DETAILED DESCRIPTION OF THE INVENTION

Figure 1:
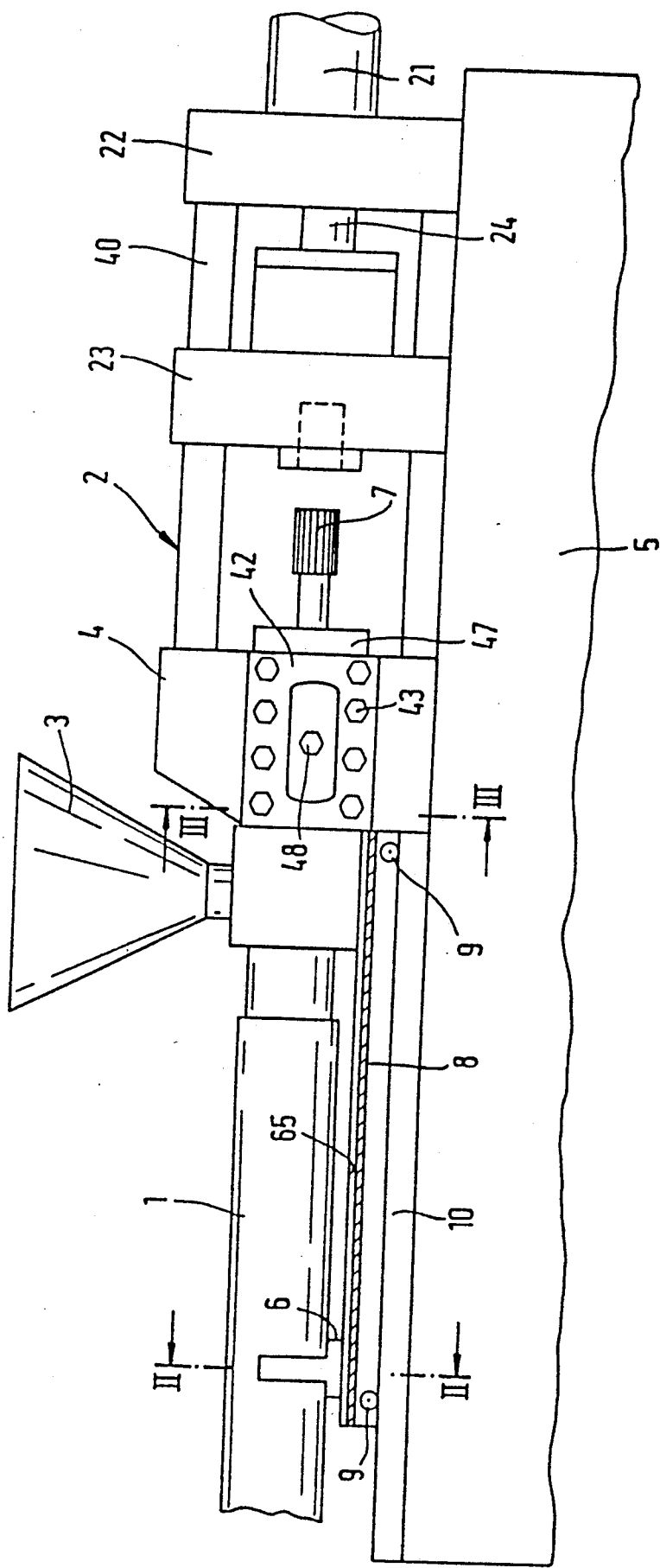
FIG. 1 is a diagrammatic side view of the injection unit of an injection molding machine according to the invention.
Figure 2:
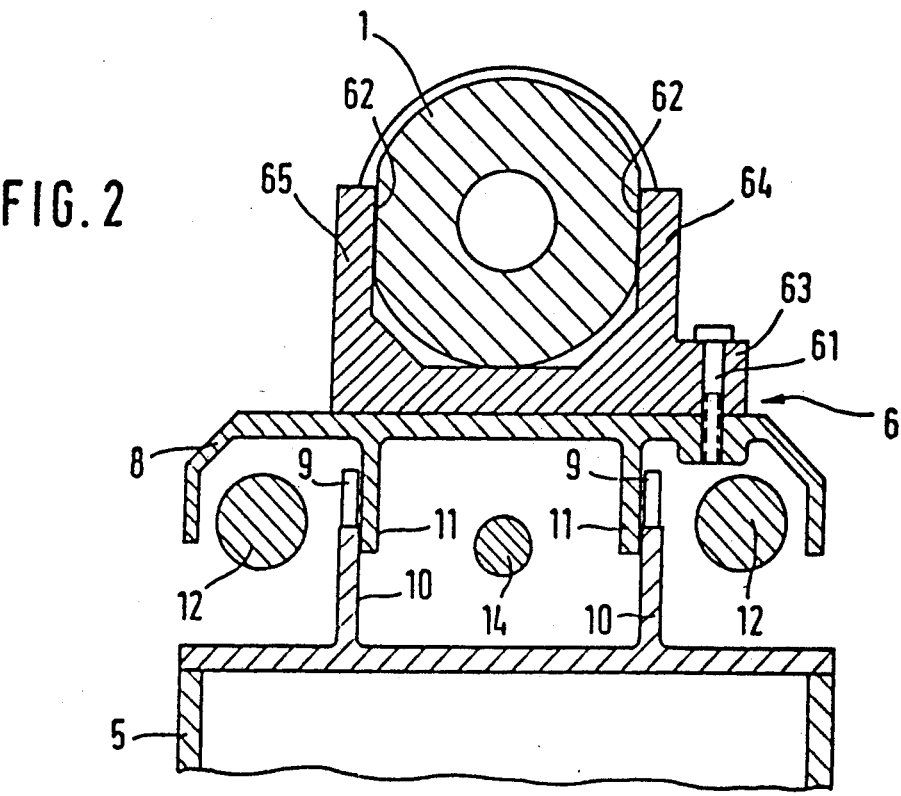
FIG. 2 is a view in cross-section taken along line II—II in FIG. 1.

The injection unit shown in FIG. 1 comprises a screw cylinder 1, a drive device 2 for the screw (not shown) which is rotatably and axially displaceably mounted in the screw cylinder 1, a filling hopper 3 for supplying plastic raw material to the screw cylinder 1 and a connecting member 4 which connects the screw cylinder 1 to the drive device 2. The drive device 2 which in known manner produces the rotary and axial movement of the screw and which therefore does not need to be especially described in regard to its mode of operation and its internal structure is displaceable on frame members 12 (see FIGS. 2 and 5) of the base frame 5 of the injection molding machine. Such displacement in per se known manner permits the entire injection unit to be moved towards and withdrawn from the molding tool (not shown). The hydraulic injection cylinder 21 which forms part of the drive device 2 is secured to an end plate 22 which is also displaceable on the frame members 12 by way of sliding bushes (not shown). That also applies in regard to the connecting member 4 which forms a rigid unit with the end plate 22 of the injection cylinder 21 by means of a frame arrangement 40 formed from two parallel frame members which are arranged in vertically superposed relationship. The transmission housing 23 which accommodates the rotary drive of the drive device 2 is displaceable on the frame arrangement 40 by a distance which approximately corresponds to the injection stroke movement of the screw. The transmission housing 23 is connected to the piston rod 24 of the injection cylinder 21 and therefore accompanies the screw in its axial movements in operation of the injection molding machine.

Figure 3:
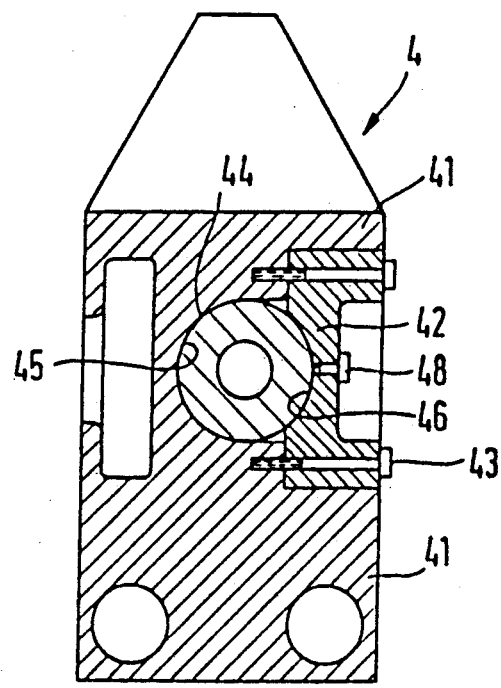
FIG. 3 is a view in cross-section taken along line III—III in FIG. 1.
Figure 4:
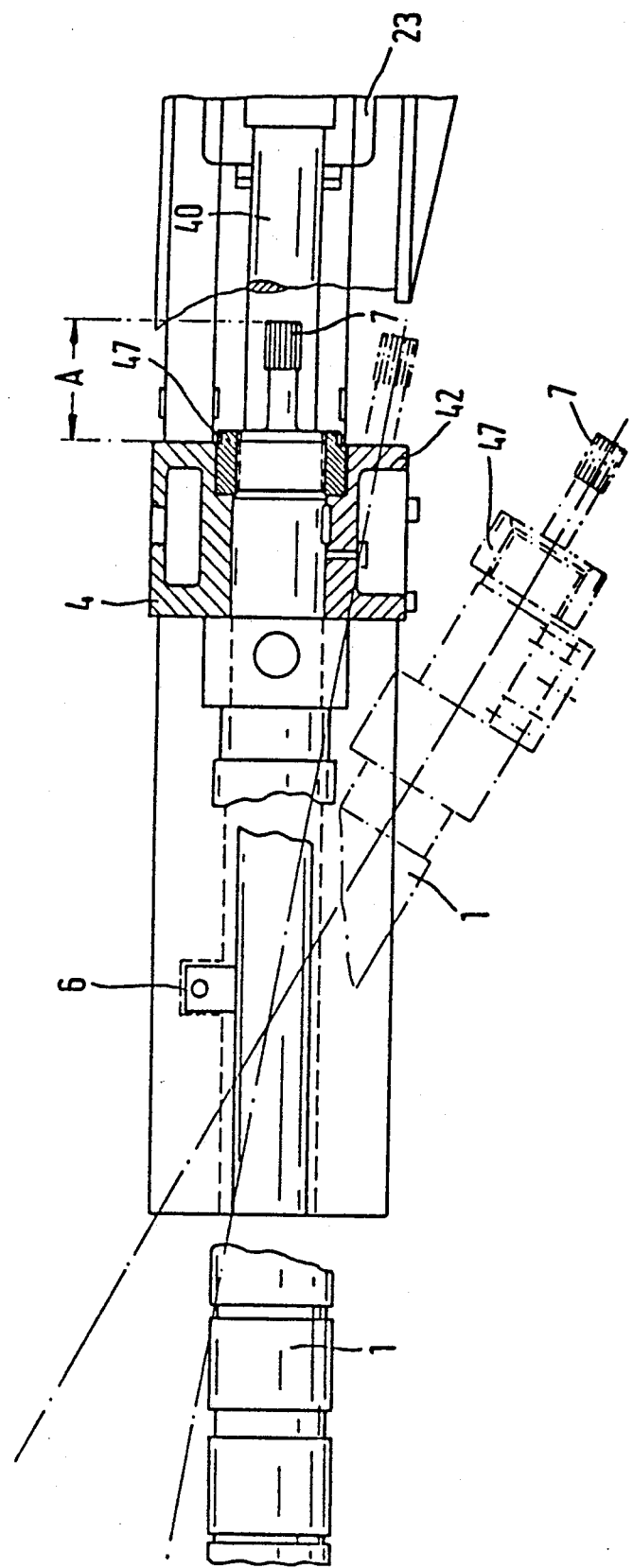
FIG. 4 is a partly sectional plan view of the injection unit, with the screw cylinder being shown partly in the position of having been pivoted away.
Figure 5:
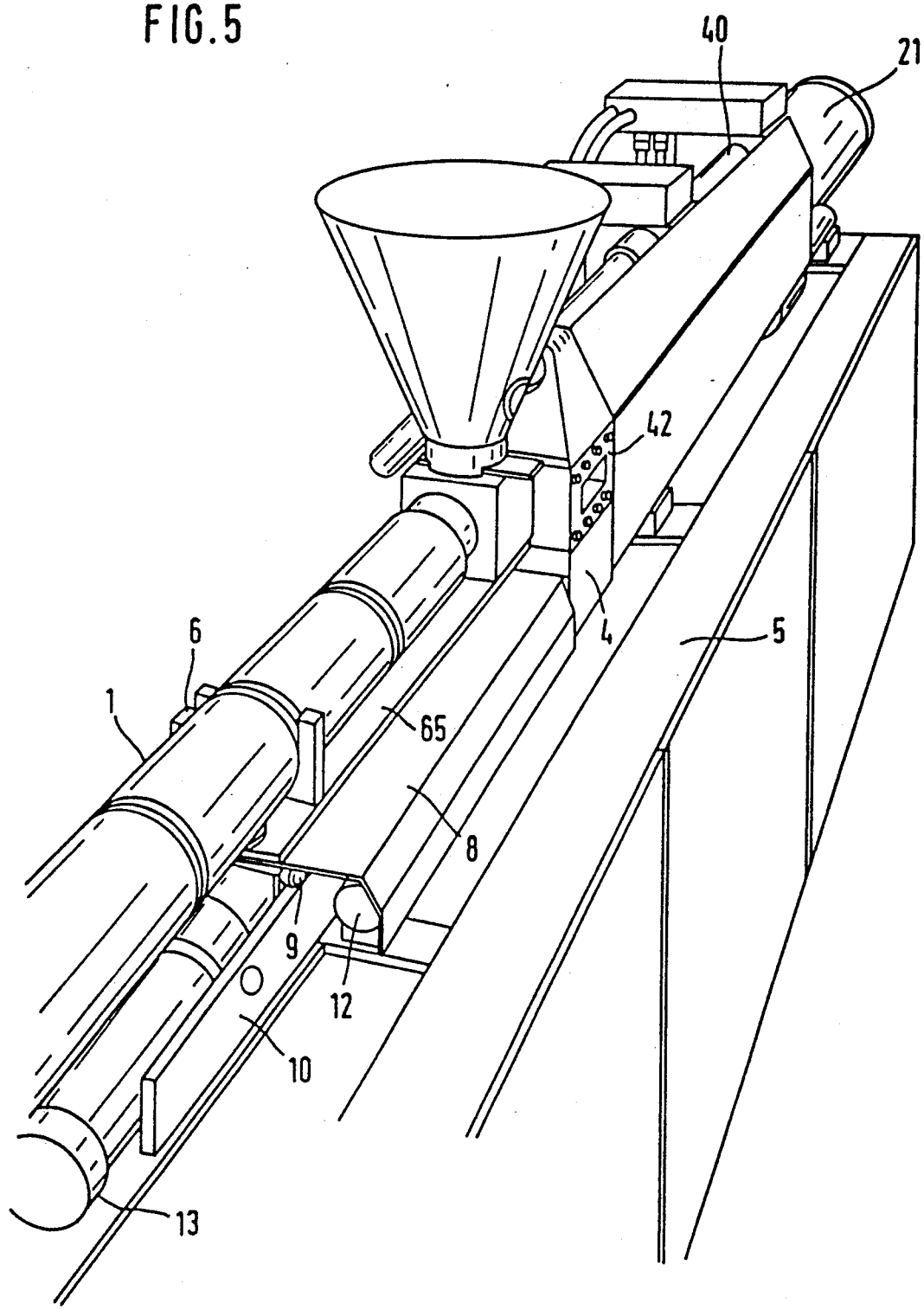
FIG. 5 is a perspective view of the injection unit in the operative position thereof.
Figure 6:
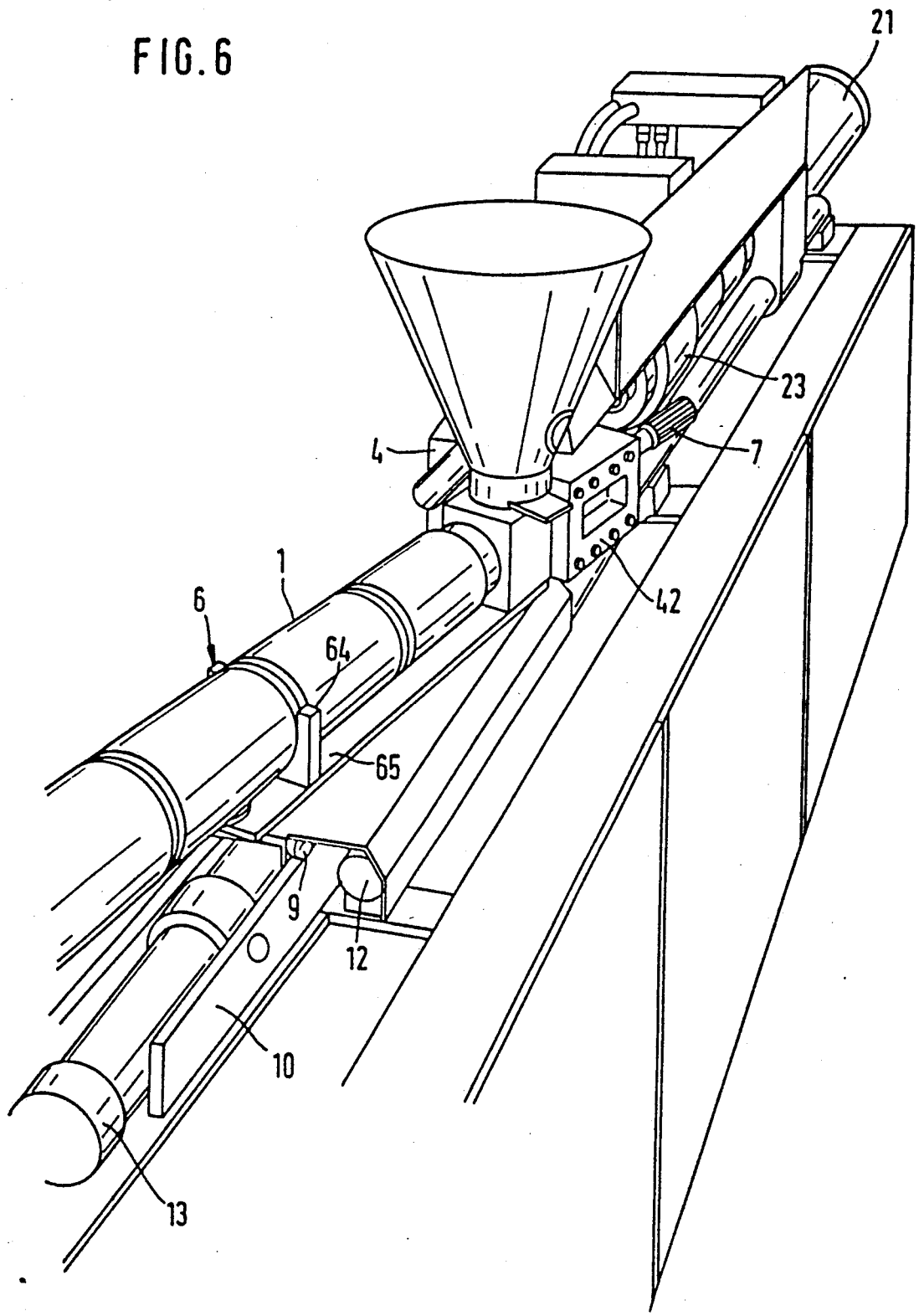
FIG. 6 is a perspective view similar to that shown in FIG. 5, illustrating the screw cylinder in the condition of being partially pivoted away, with the rear end of the screw being accessible.

As can be seen from FIGS. 4 and 6, the screw has a rear end which projects rearwardly by the distance A out of the connecting member 4 and which is provided with a spline arrangement 7. In the operative position of the injection unit as shown in FIGS. 1 and 5 the spline arrangement 7 is engaged with a hollow shaft (not shown) in the transmission housing 23 in such a way that it can be released therefrom by virtue of an axial movement. As FIGS. 3 and 4 show, the connecting member 4 is a box-like cast member of substantially U-shaped configuration. The inward sides of the limbs 41 of the U-shaped shape, which are disposed horizontally and which define an opening in the connecting member 4, which faces towards the operating side of the injection molding machine, form respective contact surfaces for a clamping cover 42 which is to be fitted into the opening and which can be braced towards the rear wall 44 of the opening by means of screws 43. The rear wall 44 and the inward side of the clamping cover 42 each have a respective part-cylindrical recess 45 and 46 respectively which are of a shape which corresponds in a complementary fashion to the rear end of the screw cylinder so that same is firmly held in the connecting member 4 in the installed condition. As can further be seen from FIG. 4, the part-cylindrical recesses 45 and 46 are stepped in their rear end region to provide a larger diameter in order to be able to accommodate a nut 47 which is screwed on to the rear end of the screw cylinder 1. The nut 47 serves for axially supporting the screw cylinder 1 in relation to the forces which are applied in the injection stroke movement by the injection cylinder 21.

Besides being supported in the connecting member 4 the screw cylinder 1 is mounted by way of a pivot mounting 6 on a carriage or slider 8 which is movable by means of rollers 9 on a pair of rails 10 of the base frame 5 in the axial direction of the screw cylinder 1 in the operative position thereof. The rollers 9 are mounted on downwardly projecting longitudinal ribs 11 of the carriage 8 in such a way that the longitudinal ribs 11 project downwardly beyond the rollers 9 and provide for lateral guidance of the carriage 8 on the rails 10. The rails 10 are each disposed between a respective one of the frame members 12 and a hydraulic cylinder 13 with piston rod 14 (see FIGS. 2 and 5) which can displace the entire injection unit relative to the molding tool (not shown) and which is fixedly connected to the base frame 5 of the injection molding machine.

At its longitudinal side which is remote from the operating side of the injection molding machine the carriage 8 carries a vertically upstanding fixed mounting pin 61 which forms a part of the pivot mounting 6 and which for that purpose extends into a bore in a mounting lug 63 on a mounting plate 65. The mounting plate 65 has a vertically disposed fork 64 with which it embraces two oppositely disposed parallel flats 62 in an annular groove in the screw cylinder 1, and is mounted pivotably on the horizontal surface of the carriage 8, being supported thereon. The mounting plate 65 serves to support the screw cylinder 1.

The process according to the invention for removal of the screw takes place in the following manner, with the described embodiment of the injection molding machine:

Firstly an axial connection which is possibly provided between the end of the screw and the transmission housing 23 is released. Release of that connection, if provided, is effected in a condition in which the transmission housing 23 is moved rearwardly away from the connecting member 4 so that the connecting location is accessible. The transmission housing 23 and therewith also the screw are now moved into their foremost limit position by the injection piston 21 so that the rear end of the screw projects into the transmission housing 23 over the smallest possible distance A. The transmission housing is now withdrawn from the rear end of the screw by again retracting the transmission housing 23 by means of the injection cylinder 21 because the frictional forces with which the screw is held in the screw cylinder greatly outweigh those frictional forces which obtain between the spline shaft 7 and the hollow shaft engaged therewith (that condition is shown in FIG. 1). After the rear end of the screw has come completely out of the transmission housing, the screw means 43 of the cover 42 can be released so that the rear end of the screw cylinder 1 is no longer held fast in the connecting member 4. The clamping cover 42 is fixed to the screw cylinder 1 by a screw 48 so that, together therewith, it can now be pivoted laterally, that is to say towards the operating side, about the pivot mounting 6, together with the mounting plate 65, as shown in FIGS. 4 and 5. The pivot mounting 6 is located substantially at the longitudinal center of the screw cylinder 1, but in a laterally displaced position with respect to the longitudinal axis of the screw cylinder. The pivotal movement can be comparatively slight as it is sufficient if the rear end of the screw with the splines 7 can be gripped by hand so that the screw can be pulled out of the screw cylinder 1.

As plastic material is generally to be found in the screw cylinder 1 when the screw is removed, the screw removal operation can only be carried out in a condition in which the plastic material is substantially fluid, that is to say the screw cylinder 1 and the screw must be heated in the screw removal operation. For that reason and also because of the screw being of considerable weight in the case of injection molding machines of larger sizes, purely manual removal thereof is inexpedient. Therefore, in accordance with the process of the invention, an auxiliary apparatus shown in FIGS. 7 and 8 is used for withdrawing the screw. The auxiliary apparatus comprises a frame structure which is formed from two supports 70 and two longitudinal bearers 71 which are arranged in mutually parallel relationship. The frame structure can be fixed, for example screwed or clamped fast, on the base frame 5 of the injection molding machine, by means of the supports 70. The auxiliary apparatus is fixed to the base frame in a position such that the front end of the longitudinal bearers 71 is below the spline arrangement on the screw, which is now exposed, and the longitudinal bearers are also disposed parallel to the longitudinal axis of the screw cylinder 1, which now extends at an inclined angle. The longitudinal bearers 71 are of a U-shaped configuration and are disposed with their limbs facing towards each other (see FIG. 8). The lower limbs form tracks for rollers 72 of a connecting means 73 which essentially comprises an upstanding angle member 74 with a screw hole. A fixing screw 75 can be passed through the screw hole and screwed into a screwthreaded bore at the rear end of the screw (see FIG. 7). The connecting means 73 is connected by way of a pulling means 76, for example a wire cable or a traction chain, to a hand-actuated winch 77 fixed to the rear end of the longitudinal bearers 71. After the screw 75 has been screwed into the end of the screw of the machine, the screw of the machine can be withdrawn from the screw cylinder 1 by actuation of the winch 77; as that operation takes place, as an increasing length of the screw is pulled out, the screw comes to bear on the top side of the longitudinal bearers 71 which form a support surface therefor. The operation of pulling the screw out of the machine can be assisted by a tool 78 which is fitted on to the spline arrangement 7, by performing reciprocating rotary movements of the screw.

We claim:
1. A screw-type injection molding machine comprising:
   a base frame;
   an injection unit supported by said base frame, said injection unit including a screw cylinder, a screw which is rotatably and axially displaceably mounted within said screw cylinder and a drive device for driving said screw, said drive device being positioned axially behind said screw cylinder, said screw cylinder and said drive device being axially displaceable with respect to each other;
   a carriage movably mounted to said base frame;
   a pivot mounting connected to said carriage;
   said screw cylinder being mounted to said pivot mounting such that it is rotatable about a vertical pivot axis which is disposed approximately at the longitudinal center of said screw cylinder, said vertical pivot axis being laterally displaced with respect to the longitudinal axis of said screw cylinder;
   whereby the rear end of said screw is accessible when said screw cylinder is rotated about said vertical pivot axis to a first rotational position.

2. A machine is defined in claim 1 wherein said screw cylinder is releaseably connected to said drive device.

3. A machine as defined in claim 2 including a connecting member connecting said screw cylinder and said drive device.

4. A machine as defined in claim 3 wherein said pivot mounting comprises a fork-shaped member, said screw cylinder being mounted within said fork-shaped member.

5. A machine as defined in claim 3 wherein said base frame includes a pair of longitudinal rails, said carriage being movably mounted upon said rails.

6. A machine as defined in claim 5 wherein said drive device includes an injection cylinder mounted on an end plate, said injection cylinder including a piston rod, a transmission housing being connected to said piston rod and slidably mounted on frame members, said transmission housing being displaceable upon movement of said piston rod on said frame members, said connecting member, said end plate and said frame members forming a substantially rigid guide unit for said transmission housing.

7. A machine as defined in claim 3 wherein said pivot mounting includes a mounting plate pivotably mounted to said carriage, said screw cylinder being mounted to said mounting plate.

8. A machine as defined in claim 3 wherein said drive device includes an injection cylinder mounted on an end plate, said injection cylinder including a piston rod, a transmission housing being connected to said piston rod and slidably mounted on frame members, said transmission housing being displaceable upon movement of said piston rod on said frame members, said connecting member, said end plate and said frame members forming a substantially rigid guide unit for said transmission housing.

9. A machine as defined in claim 3 wherein said connecting member includes a lateral opening, a clamping cover mounted to said connecting member and positioned within said opening, said screw cylinder having a rear end positioned within said opening.

10. A machine as defined in claim 1 wherein said pivot mounting includes a mounting plate pivotably mounted to said carriage, said screw cylinder being mounted to said mounting plate.

11. A machine as defined in claim 1 wherein said carriage is releaseably connected to said base frame.

12. A method for removing a screw from a screw cylinder of a screw-type injection molding machine, the machine being of the type including a drive device releaseably connected to said screw cylinder for axially displacing and rotating said screw, comprising the steps of:

releasing said screw cylinder from said drive device;

displacing said screw cylinder and said drive device from each other by a predetermined axial distance until the rear end of said screw has been freed from said drive device;

pivoting said screw cylinder about a vertical pivot axis, said vertical pivot axis being disposed approximately at the longitudinal center of said screw cylinder; and withdrawing said screw rearwardly from said screw cylinder.

* * * * *